(12) United States Patent
Makos (10) Patent No.: US 10,058,181 B2
(45) Date of Patent: Aug. 28, 2018

(54) ICE SHELTER SEAT WITH REMOVABLE STORAGE

(71) Applicant: Plano Molding Company, Plano, IL (US)

(72) Inventor: Timothy S. Makos, West Bend, WI (US)

(73) Assignee: PLANO MOLDING COMPANY, Plano, IL (US)

( * ) Notice: Subject to any disclaimer, the term of this patent is extended or adjusted under 35 U.S.C. 154(b) by 273 days.

(21) Appl. No.: 15/041,455

(22) Filed: Feb. 11, 2016

(65) Prior Publication Data

US 2016/0242549 A1 Aug. 25, 2016

Related U.S. Application Data

(60) Provisional application No. 62/119,516, filed on Feb. 23, 2015.

(51) Int. Cl.
| | | |
|---|---|---|
| A47C 1/14 | (2006.01) |
| E04H 15/00 | (2006.01) |
| A47C 4/52 | (2006.01) |
| A47C 7/66 | (2006.01) |
| A01K 97/22 | (2006.01) |

(52) U.S. Cl.
CPC .............. *A47C 1/14* (2013.01); *A47C 4/52* (2013.01); *A47C 7/66* (2013.01); *E04H 15/001* (2013.01); *A01K 97/22* (2013.01)

(58) Field of Classification Search
CPC .......... A01K 97/22; A47C 7/10; A47C 13/00; A47C 7/66; E04H 15/001
USPC .......... 297/105, 217.7, 134, 188.01, 188.09; 135/116, 96
See application file for complete search history.

(56) References Cited

U.S. PATENT DOCUMENTS

| | | | |
|---|---|---|---|
| 2,937,651 A | 5/1960 | Van Tassel | |
| 3,012,567 A | 12/1961 | Walton | |
| 3,586,013 A | 6/1971 | Gladden | |
| 3,703,311 A | 11/1972 | Davis et al. | |
| 4,088,363 A | 5/1978 | Palmer | |
| 4,585,020 A | 4/1986 | Masuda et al. | |
| 4,612,948 A | 9/1986 | Simpson | |
| 4,683,672 A | 8/1987 | Davis | |
| 5,271,423 A | 12/1993 | Eychaner | |
| 5,368,057 A | 11/1994 | Lubkeman et al. | |
| 5,692,335 A | 12/1997 | Magnuson | |
| 5,755,057 A * | 5/1998 | Dancer .................. A01K 97/06 206/315.11 |

(Continued)

OTHER PUBLICATIONS

Written Opinion and International Search Report issued on related PCT Application No. PCT/US2013/063270 on Jan. 13, 2014.

(Continued)

*Primary Examiner* — Syed A Islam
(74) *Attorney, Agent, or Firm* — Leason Ellis LLP (57) ABSTRACT

A portable shelter includes a base including a floor and a seating unit mounted on the base. The seating unit includes a support unit configured to support and removably hold a removable storage. The removable storage includes a storage space and a substantially flat top surface for supporting a user in a seating position. The support unit includes a surface pattern configured to make contact with the removable storage when the removable storage is mounted on the support unit.

17 Claims, 8 Drawing Sheets

(56) References Cited

U.S. PATENT DOCUMENTS

| | | | |
|---|---|---|---|
| 7,604,290 B1 * | 10/2009 | Giordano | A47C 3/32 |
| | | | 220/915.2 |
| 8,191,564 B1 | 6/2012 | Lindholm | |
| 8,262,159 B2 * | 9/2012 | Daniels, Jr. | B60N 2/24 |
| | | | 224/404 |
| 9,194,153 B2 | 11/2015 | Makos et al. | |
| 2004/0245817 A1 | 12/2004 | Kleckner | |
| 2006/0081281 A1 | 4/2006 | Makos et al. | |
| 2006/0238005 A1 | 10/2006 | Walter et al. | |
| 2009/0320893 A1 * | 12/2009 | Engstrom | E04H 15/001 |
| | | | 135/96 |
| 2010/0307550 A1 | 12/2010 | Silverberg et al. | |
| 2012/0186619 A1 | 7/2012 | Makos | |
| 2017/0008438 A1 * | 1/2017 | Clark | B60N 2/64 |

OTHER PUBLICATIONS

Canadian Intellectual Property Office, Requisition, Appln. No. 2,921,060, dated Mar. 3, 2017.

* cited by examiner

FIG. 5B ental Patent Application No. 62/119,516
ICE SHELTER SEAT WITH REMOVABLE STORAGE

CROSS REFERENCE TO PRIOR APPLICATIONS

This application claims priority to and the benefit thereof from U.S. Provisional Patent Application No. 62/119,516 filed on Feb. 23, 2015, titled "Ice Shelter Bench Seat with Removable Storage Case," the entirety of which is hereby incorporated herein by reference.

FIELD OF THE DISCLOSURE

The present disclosure relates generally to a portable shelter, and more specifically it relates to a portable shelter with a seat having a removable storage.

BACKGROUND OF THE DISCLOSURE

Portable shelters for ice fishing or other outdoor sports/recreational activities typically include a transportable base that is combined with a frame and a covering that overlays the frame. Some of these shelters include a kind of seating system for fishermen to sit on while fishing. These seating systems can range from a single seat to multiple seats to a bench seat spanning one side of the base. These shelters, however, are provided without storage space, and fishermen are very often required to carry additional bags, which can be cumbersome and inconvenient. Accordingly, there exists an unfulfilled need for a portable shelter that is provided with a storage space without sacrificing portability and functionality thereof.

SUMMARY OF THE DISCLOSURE

Accordingly, one aspect of the present disclosure provides a portable shelter which includes a base including a floor and a seating unit mounted on the base. The seating unit includes a support unit configured to support and removably hold a removable storage. The removable storage includes a storage space and a substantially flat top surface for supporting a user in a seating position. The support unit includes a surface pattern configured to make contact with the removable storage when the removable storage is mounted on the support unit.

The surface pattern may be configured to make contact with and surround a corner of the removable storage when the removable storage is placed on the support unit.

The support unit may further include a first longitudinal member extending along a longitudinal direction of the floor and having a first end and a second end, a second longitudinal member extending in parallel with the first longitudinal member and having a first end and a second end, a first end unit located on a first side portion of the floor and connected to the first ends of the first and second longitudinal members, and a second end unit located on a second side portion of the floor and connected to the second ends of the first and second longitudinal members. The surface pattern may be formed on at least one of the first end unit and the second end unit.

The support unit may further include a first leg extending from the first end unit to the floor, and a second leg extending from the second end unit to the floor.

The floor may include a plurality of ribs thereon and extending in parallel with a predetermined gap therebetween. Each of the first leg and the second leg may include a foot formed at an end thereof and inserted into the predetermined gap.

The portable shelter may further include a first bracket coupled between a first corner portion of the base and the first end unit, and a second bracket coupled between a second corner portion of the base and the second end unit.

The removable storage may further include a cushion having the substantially flat top surface. The removable storage may further include a fastener for keeping the removable storage closed.

The portable shelter may further include a back support extending upwardly from the support unit for laterally supporting a back of the user in the seating position. The back support may be foldable.

According to another aspect of the disclosure, a shelter seat includes a removable storage including a storage space and a substantially flat top surface for supporting a user in a seating position, and a support unit configured to attach to a base having a floor and support and removably hold the removable storage. The support unit includes a surface pattern configured to make contact with the removable storage when the removable storage is mounted to the support unit.

The surface pattern may be configured to make contact with and surround a corner of the removable storage when the removable storage is mounted to the support unit.

The support unit may further include a first longitudinal member extending along a longitudinal direction of the floor and having a first end and a second end, a second longitudinal member extending in parallel with the first longitudinal member and having a first end and a second end, a first end unit located on a first side portion of the floor and connected to the first ends of the first and second longitudinal members, and a second end unit located on a second side portion of the floor and connected to the second ends of the first and second longitudinal members. The surface pattern may be formed on the first end unit and the second end unit.

The shelter seat may further include a first leg extending from the first end unit, and a second leg extending from the second end unit.

The shelter seat may further include a back support extending from the support unit for laterally supporting a back of the user in the seating position.

According to yet another aspect of the disclosure, a portable shelter includes a movable base including a floor, a support unit configured to connect to the movable base and further configured to support and removably hold a removable storage. The removable storage includes a storage space and a surface for supporting a user in a seating position. The portable shelter further includes a back support extending upwardly from the support unit for laterally supporting a back of the user in the seating position. The support unit includes a surface pattern configured to contact the removable storage when the removable storage is mounted on the support unit.

The surface pattern may be configured to contact and surround a corner of the removable storage when the removable storage is mounted on the support unit.

The support unit may further include a first longitudinal member extending along a longitudinal direction of the floor and having a first end and a second end, a second longitudinal member extending in parallel with the first longitudinal member and having a first end and a second end, a first end unit located on a first side portion of the floor and connected to the first ends of the first and second longitudinal members, and a second end unit located on a second side portion of the floor and connected to the second ends of the first and second longitudinal members. The surface pattern may be formed on at least one of the first end unit and the second end unit.

The support unit may further include a first leg extending from the first end unit to the floor, and a second leg extending from the second end unit to the floor. The back support may be foldable.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The terms "including," "comprising" and variations thereof, as used in this disclosure, mean "including, but not limited to," unless expressly specified otherwise.

The terms "a," "an," and "the," as used in this disclosure, means "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, or the like, may be described in a sequential order, such processes and methods may be configured to work in alternate orders. In other words, any sequence or order of steps that may be described does not necessarily indicate a requirement that the steps be performed in that order. The steps of the processes or methods described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

Figure 1:
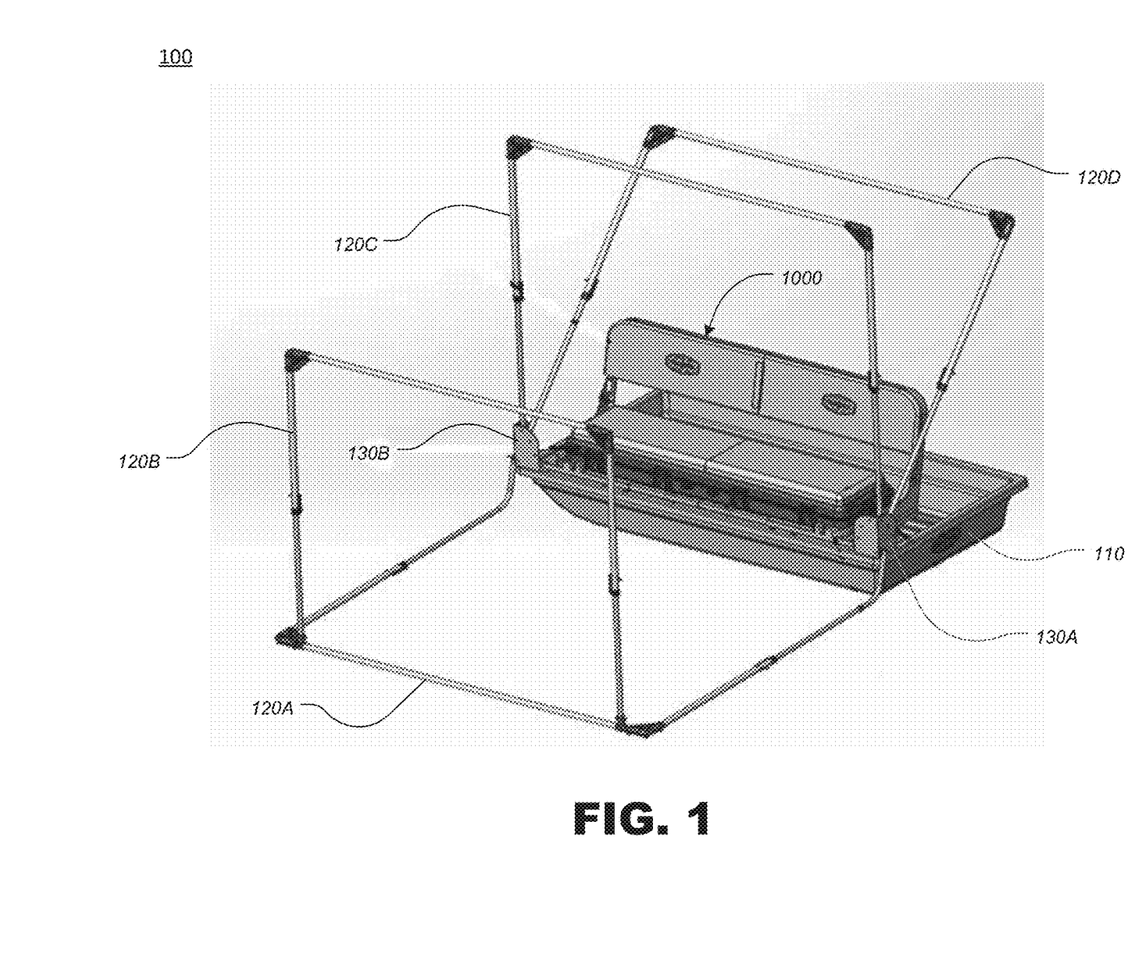
FIG. 1 shows a perspective view of a portable shelter without a cover, which is constructed according to the principles of the disclosure.

FIG. 1 shows a perspective view of a portable shelter 100 without a cover, which is constructed according to the principles of the disclosure. The portable shelter 100 may be used as a portable fishing house, a camping shelter, a portable storage, an emergency storage or shelter, or the like. The portable shelter 100 may comprise a base 110, a frame 120, a pair of brackets 130A, 130B, a shelter seat 1000, a cover (not shown), and/or the like. The brackets 130A, 130B may be placed at front left and front right corners of the base 110, respectively. The frame 120 may include a plurality of support members, such as, for example, support members 120A, 120B, 120C, 120D, that may be pivotally connected to the first and second brackets 130A, 130B. When the shelter 100 is being transported or stored, the support members 120A, 120B, 120C, 120D may be folded and rotated together to be mounted on (or in) the base 110. An example of such a portable shelter, without the shelter seat 1000, is described in U.S. Pat. No. 9,194,153, titled "FRAME FOR PORTABLE SHELTER AND ASSEMBLY," the entire content of which is incorporated herein by reference.

Figure 2:
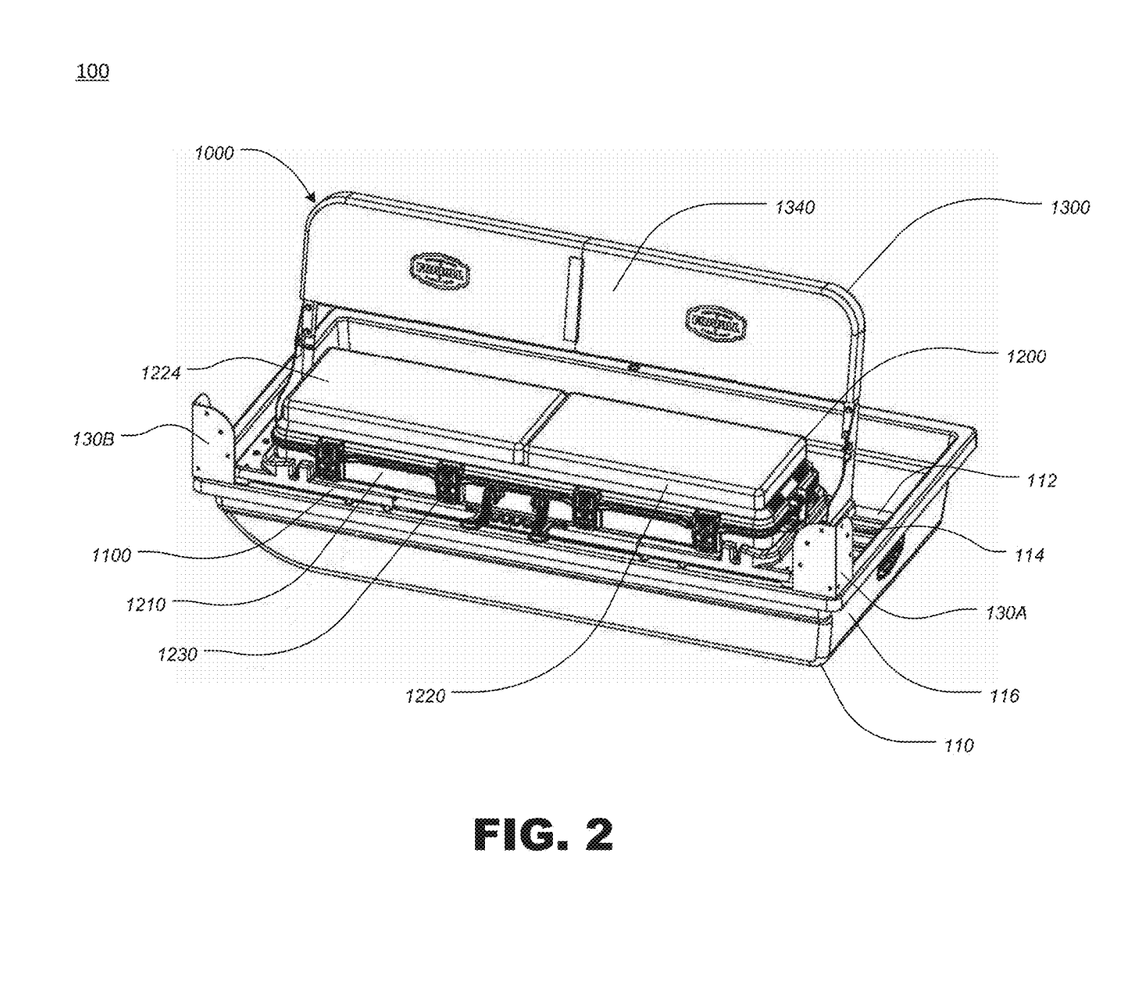
FIG. 2 shows another perspective view of the portable shelter shown in FIG. 1, without portions of a frame.
Figure 3:
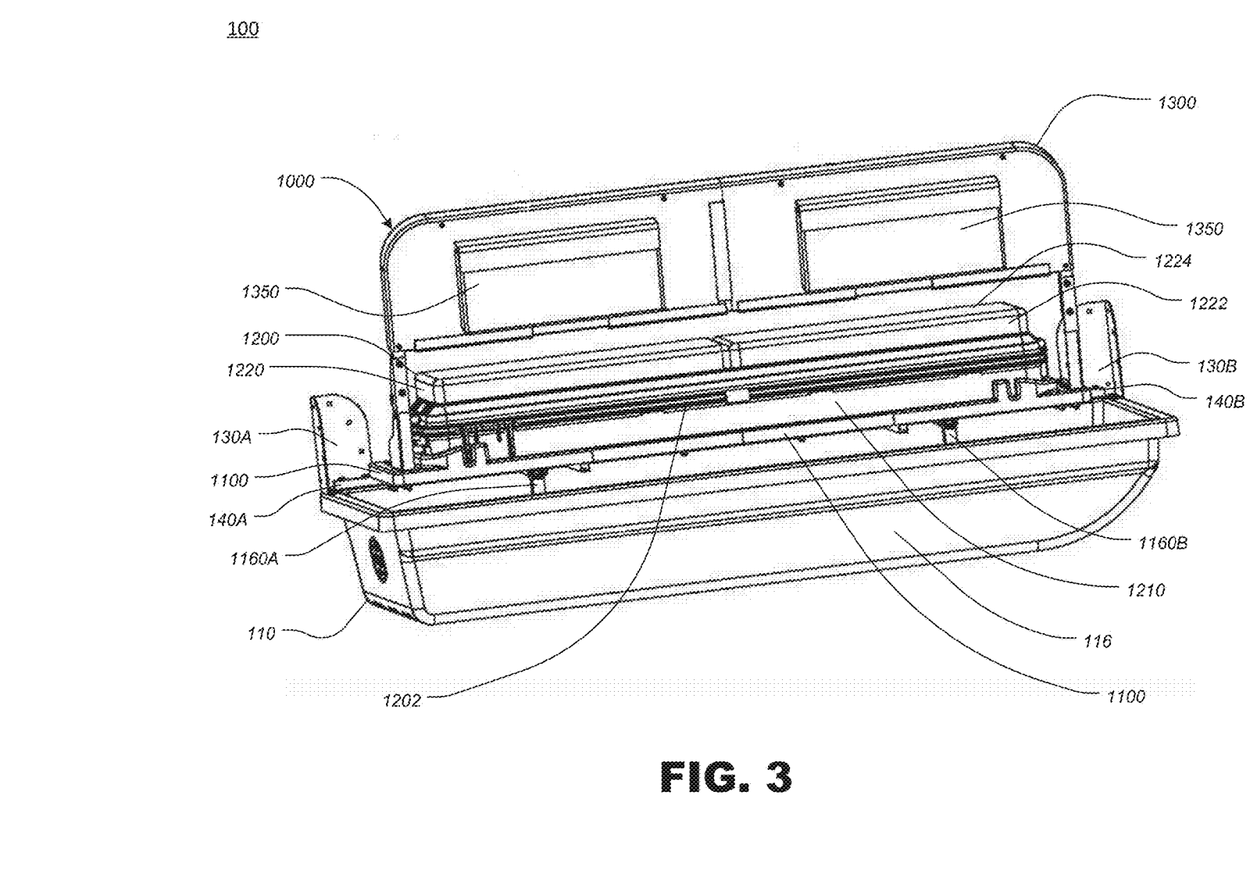
FIG. 3 shows a rear perspective view of a seating portion of the portable shelter shown in FIG. 2.

FIG. 2 shows a perspective view of the seating portion of the portable shelter 100 shown in FIG. 1, without the frame 120. FIG. 3 shows a rear perspective view of the seating portion of the portable shelter 100 shown in FIG. 2. Referring to FIGS. 2 and 3 concurrently, the seating portion includes the shelter seat 1000, which may be mounted to the base 110, such as on a floor 112 of the base 110. The floor 112 may have a plurality of ribs 114 (shown in FIG. 2), which may increase strength and rigidity of the base 110. The ribs 114 may extend in parallel along a longitudinal direction of the floor 112 with a predetermined gap therebetween. The ribs 114 may extend transversely, in a direction that is substantially perpendicular to the longitudinal direction of the floor 112. The floor 112 may be surrounded by sidewalls 116. The sidewalls 116 may extend upwardly from edges of the floor 112 to prevent water, dirt and/or the like from entering onto the base 110 and accumulating on the floor 112. The sidewalls 116 and floor 112 may be formed as a single piece or assembled from multiple pieces.

The shelter seat 1000 may include a support unit 1100, a removable storage 1200, a back support 1300, and/or the like. The support unit 1100 may be connected to the base 110. The removable storage 1200 may be removably mounted on the support unit 1100. Once correctly mounted on the support unit 1100, a bottom portion of the removable storage 1200 may be held snugly by the support unit 1100, and hence may not move around. The removable storage 1200 may be removed from the shelter seat 1000 when a force is applied to push or pull the removable storage 1200 in a specific direction, such as, for example, in a direction away from the support unit 1100.

The removable storage 1200 may have a substantially flat first (or top) surface 1224 that may function as a seating surface, which may support the user in, for example, a sitting or a lying position. The first surface 1224 may be wide enough for two or more users to sit thereon side by side. The removable storage 1200 may include a lower body 1210 and an upper body 1220. The lower body 1210 and the upper body 1220 may be substantially the same in structure, but may be configured to oppose and fasten to each other to form a storage area. Alternatively, the lower body 1210 and the upper body 1220 may differ from each other, but may be configured oppose and fasten to each other to form a storage area. The removable storage 1200 may include one or more fasteners 1230 to keep the removable storage 1200 closed. The fasteners 1230 may be latches, as shown in FIG. 2, but other types of fasteners may also be used, such as, for example, a lock, a magnet, a zipper, a buckle, a clasp, a button, a snap fastener, a hoop-and-loop fastener, a captive faster, and the like.

Figure 4A:
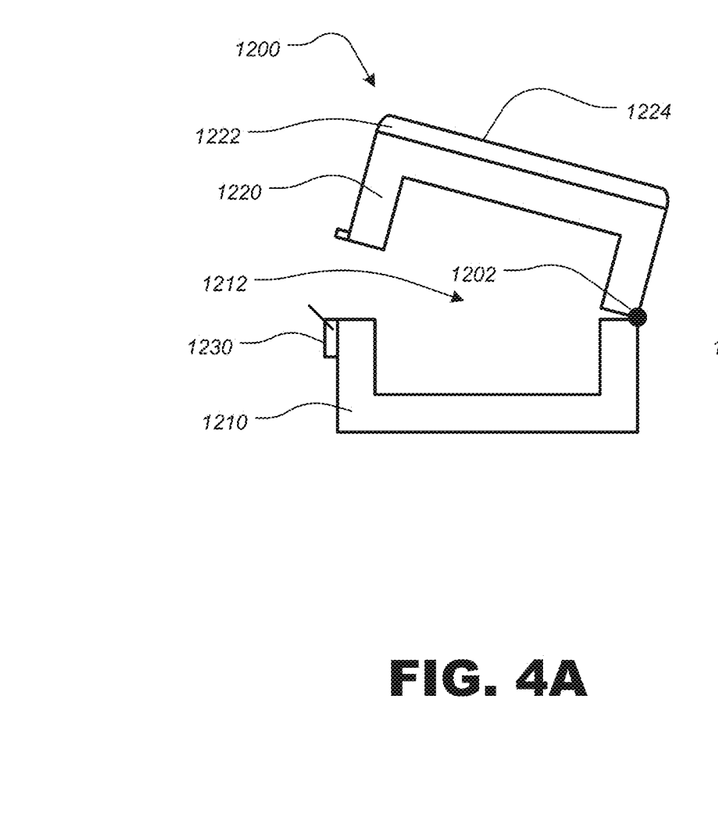
FIG. 4A shows a cross-sectional view of a removable storage of the seating portion of the portable shelter shown in FIGS. 2 and 3.
Figure 4B:
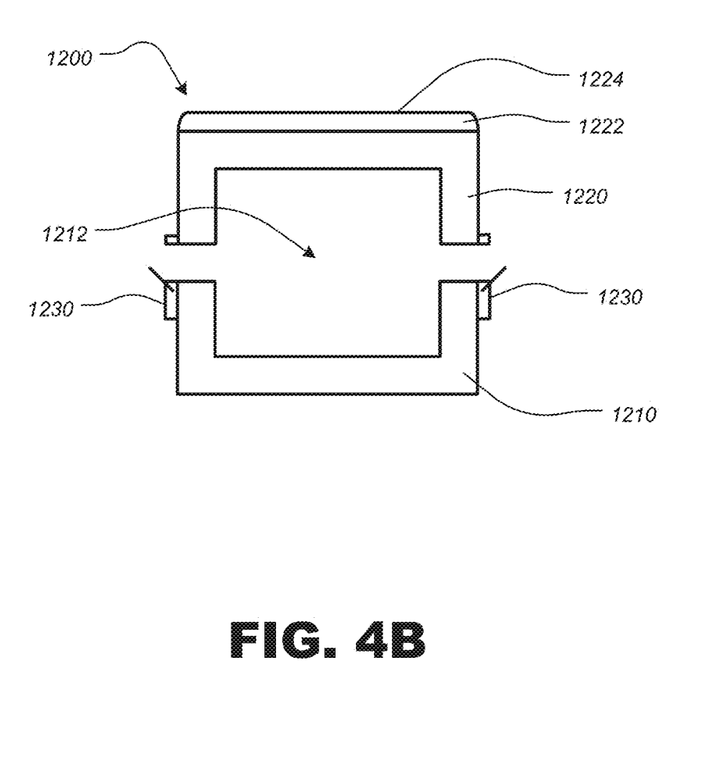
FIG. 4B shows a cross-sectional view of another removable storage of the seating portion of the portable shelter shown in FIGS. 2 and 3.

FIGS. 4A and 4B show cross-sectional views of an example of a removable storage 1200, in which the upper body 1420 is in an open position. The removable storage 1200 may be used in the portable shelter (shown in FIGS. 1-3). As described above, the lower body 1210 and the upper body 1220 may be configured to oppose and fasten to each other to form a storage area 1212. Upon releasing or unlocking the fasteners 1230, the upper body 1220 may be opened or separated from the lower body 1210 to expose the storage space 1212. As shown in FIG. 4A, the upper body 1220 may be pivotally attached to the lower body 1210 via a pivot axis 1202. The upper body 1220 may pivotally move upwardly or downwardly, with respect to the pivot axis 1202, to open or close the storage space 1200, respectively. Alternatively, as shown in FIG. 4B, the upper body 1220 may be completely separated from the lower body 1210.

The upper body 1220 may include a cushion 1222 at a top portion thereof. The cushion 1222 may be an integral part of the upper body 1220. The cushion 1222 may be softer than the rest of the upper body 1220. Alternatively, the upper body 1220 and the cushion 1222 may be independently manufactured parts, and the cushion 1222 may be permanently or detachably attached to the upper body 1220. The cushion 1222 may have the substantially flat top surface 1224 to vertically support the user in the seating position.

Figure 5A:
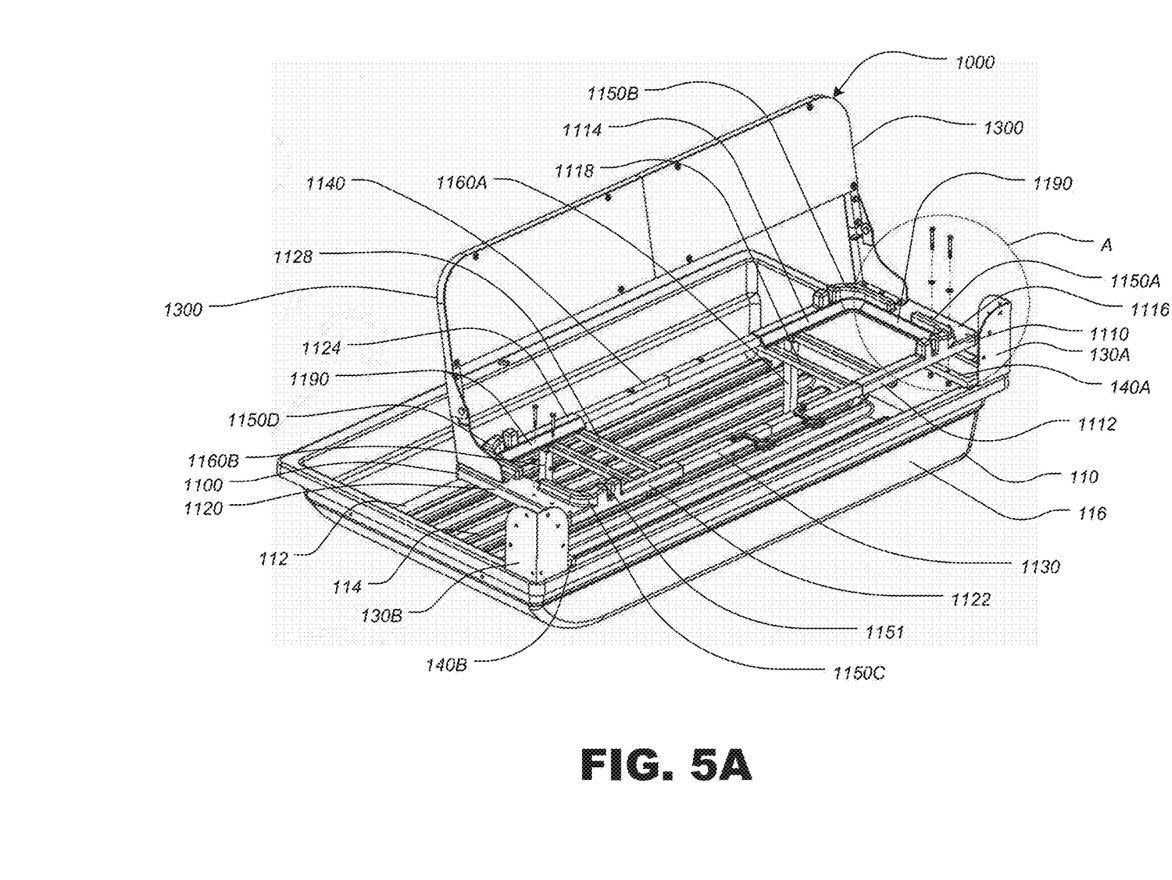
FIG. 5A shows another perspective view of the seating portion of the portable shelter shown in FIGS. 2 and 3, without the removable storage.
Figure 5B:
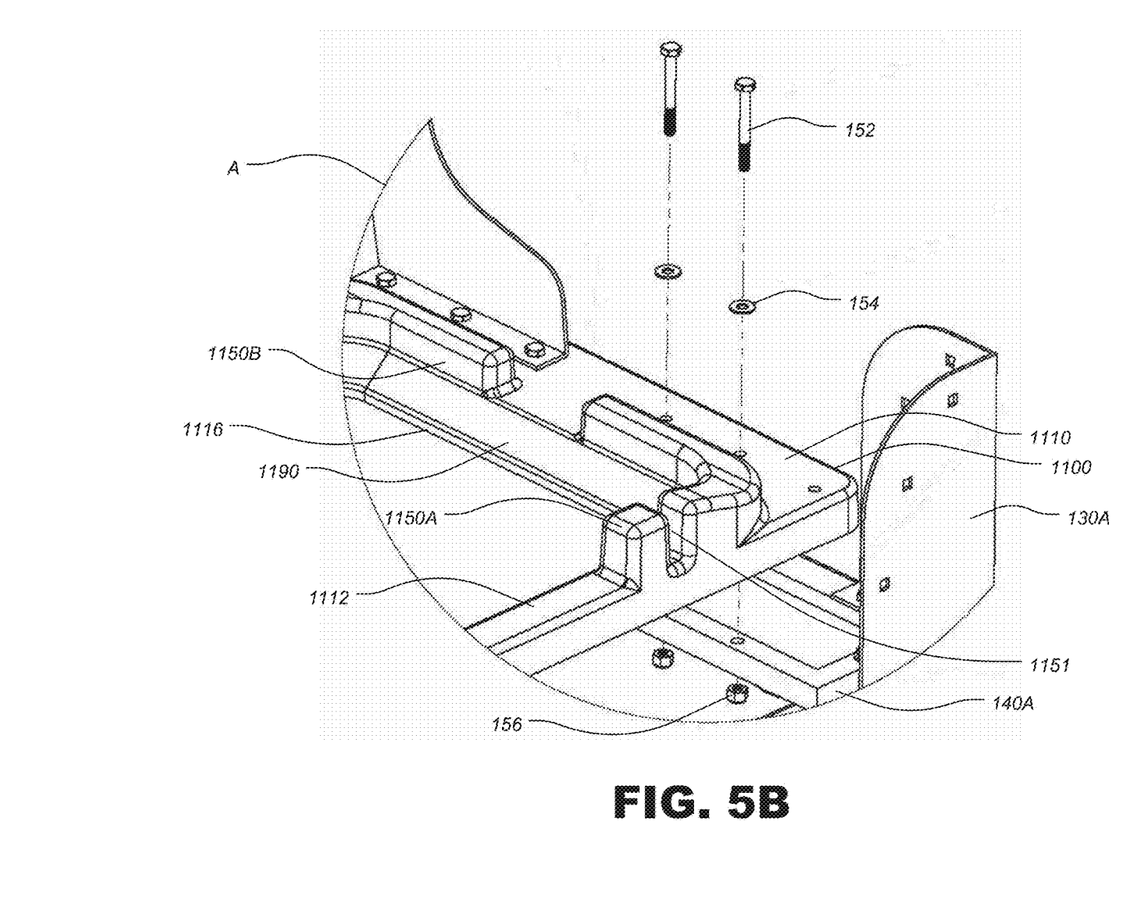
FIG. 5B shows an enlarged perspective view of a portion of the portable shelter shown in FIG. 5A, indicated by circle A.

FIG. 5A shows a perspective view of the seating portion of the portable shelter 100 shown in FIGS. 2 and 3, without the removable storage 1200. FIG. 5B shows an enlarged perspective view of a section "A" of the seating portion of the portable shelter 100 shown in FIG. 5A. The support unit 1100 may include a first end unit 1110 and a second end unit 1120. The first and second end units 1110, 1120 may have a U shape. The first and second end units 1110, 1120 may be configured as mirror images of each other.

The first end unit 1110 may include a first longitudinal component 1112, a second longitudinal component 1114, and an end unit body portion 1116. The first and second longitudinal components 1112, 1114 may extend in parallel to each other from both ends of the end unit body portion 1116, as seen in FIG. 5A. The first and second longitudinal components and the end unit body portion 1116 may be formed as a single piece or assembled from multiple pieces fastened together to form the first end unit 1110.

The first end unit 1110 may further include one or more traversing members 1118 to provide added rigidity and stability to the first end unit 1110. The one or more traversing members 1118 may be attached at one end to (or integrally formed with) the first (or second) longitudinal component and extend to the second (or first) longitudinal component, where the other end of the traversing member 1118 may be attached or integrally formed with the longitudinal component.

Similarly, the second end unit 1120 may include a first longitudinal component 1122, a second longitudinal component 1124, and an end unit body portion 1126. The first and second longitudinal components 1122, 1124 may extend in parallel to each other from both ends of the end unit body portion 1126. The second end unit 1120 may further include one or more traversing members 1128, which may extend between the first and second longitudinal components 1122, 1124.

The traversing members 1118, 1128 may be configured to support the removable storage 1200. For instance, the traversing members 1118, 1128 may be positioned as seen in FIG. 5A, where the upper surfaces of the traversing members 1118, 1128 are in the same plane as the lower surfaces of the first and second longitudinal components 1112, 1114, 1122, 1124. Alternatively, the traversing members 1118, 1128 may be positioned such that the upper surfaces of the traversing members 1118, 1128 may be in the same plane and substantially flush with the upper surfaces of the first and second longitudinal components 1112, 1114, 1122, 1124. The traversing members 1118, 1128 may increase structural integrity and rigidity of the first and second end units 1110, 1120.

The support unit 1100 may further include one or more support bars, such as, for example, a first support bar 1130, a second support bar 1140 and the like. The first and second support bars 1130, 1140 may extend between the first and second end units 1110, 1120 along the longitudinal direction of the support unit 1100. The first support bar 1130 may be connected to and extend between the first longitudinal component 1112 of the first end unit 1110 and the first longitudinal component 1122 of the second end unit 1120. Similarly, the second support bar 1140 may be connected to and extending between the second longitudinal component 1114 of the first end unit 1110 and the second longitudinal component 1124 of the second end unit 1120. The first and second end units 1110, 1120 along with the first and second support bars 1130, 1140 may form a horizontally extending structure that supports and removably engages the removable storage 1200.

The first and second end units 1110, 1120 and the first and second support bars 1130, 1140 may be configured to adjust their lengths with respect to each other, so as to accommodate varying sizes of removable storages.

Alternatively, the first and second end units 1110, 1120 and the first and second support bars 1130, 1140 may be integrally formed as a single piece or assembled into a single structure from separate pieces.

The support unit 1100 may include a surface pattern 1150 to contact and surround bottom corners of the removable storage 1200. The support unit 1100 may further include a lip portion 1190. The surface pattern 1150 may be strategically located on portions of the support unit 1100 to contact and surround corresponding bottom corners of the removable storage 1200. For example, the first end unit 1110 may include a first surface pattern 1150A and a second surface pattern 1150B. The second end unit 1120 may include a third surface pattern 1150C and a fourth 1150D.

The lip portion 1190 may be formed along the inner perimeter of the first and second end units 1110, 1120. The lip portion 1190 may contact and support portions of the lower surfaces of the removable storage 1200. The lip portion 1190 may be formed along a portion of or along the entire inner perimeter of the opening formed by the end units 1110, 1120, longitudinal components 1112, 1114, 1122, 1124, and traversing members 1130, 1140. The lip portion 1190 may be shaped and angled to match the contours of the removable storage 1200, so as to guide and secure the removable storage 1200 in an optimal support position.

The first and second surface patterns 1150A, 1150B may protrude upwardly from an upper surface of the first end unit 1110. The first surface pattern 1150A may be formed around a front (or first) corner of the first end unit 1110 between the first longitudinal component 1112 and the end unit body portion 1116. The second surface pattern 1150B may be formed around a rear (or second) corner of the first end unit 1110 between the second longitudinal component 1114 and the end unit body portion 1116.

Similarly, the third and fourth surface patterns 1150C, 1150D may protrude upwardly from an upper surface of the second end unit 1120. The third surface pattern 1150C may be formed around a front (or first) corner of the second end unit 1120 between the first longitudinal component 1122 and the end unit body portion 1126. The fourth surface pattern 1150D may be formed around a rear (or second) corner of the second end unit 1120 between the second longitudinal component 1124 and the end unit body portion 1126.

The first, second, third and/or fourth surface patterns 1150A, 1150B, 1150C, 1150D, respectively, may be formed integrally with the first and second end units 1110, 1120, or attached to the first and second end units 1110, 1120. The surface patterns 1150A, 1150B, 1150C, 1150D, may be configured to match the contours and shape of the corners of the removable storage 1120.

In another example (not shown), the surface patterns 1150A, 1150B, 1150C, 1150D, may be configured to be moveable with respect to the support unit 1100, such that the surface patterns may move away from each other to receive and engage the removable storage 1200. In this example, the surface patterns 1150A, 1150B, 1150C, 1150D may be connected to the support unit 1100 by, for example, spring mechanisms (not shown).

One or more of the surface patterns 1150A, 1150B, 1150C, 1150D may include a notch portion 1151. The notch portion 1151 may have a "U" shape. The notch portion 1151 may be configured to receive a male component (not shown) that may be attached to or provided on the removable storage 1200. The notch portion(s) 1151 may function to align and guide the removable storage 1200 to a proper resting position on the support unit 1100. The notch portion(s) 1151 may be configured to receive corresponding legs (not shown) on the removable storage 1200.

A rod member (not shown) may be optionally installed in opposing notch portions 1151 so as to provide a stop in applications where a smaller removable storage (not shown) is used. In this example, the rod member(s) may help to hold and prevent the smaller removable storage from moving around on the support unit 1100.

When the removable storage 1200 is mounted on the support unit 1100, the first and second surface patterns 1150A, 1150B may contact and surround front-left and rear-left bottom corners of the lower body 1210, respectively. The third and fourth surface patterns 1150C, 1150D may contact and surround front-right and rear-right bottom corners of the lower body 1210, respectively. Therefore, once the removable storage 1200 fits onto and removably engages the support unit 1100, the removable storage 1200 may not move around. Also, the removable storage 1200 may not be easily separated from the support unit 1100 unless the removable storage 1200 is pushed or pulled in a particular direction, for example, an upward direction, with sufficient force to disengage and remove the removable storage 1200 from the support unit 1100.

Still referring to FIG. 5A, the support unit 1100 may be attached to the base 110. The support unit 1100 may be attached to the base 110 directly or via support brackets 140, such as, for example, a first support bracket 140A and a second support bracket 140B. The first and second support brackets 140A, 140B may be located at front-left and front-right corners of the base 110, respectively. As shown in FIG. 5B, the first support bracket 140A may be mounted on a top surface of the sidewalls 116 at the front-left corner of the base 110. Similarly, the second support bracket 140B may be mounted on a top surface of the sidewalls 116 at the front-right corner of the base 110. The first and second end units 1110, 1120 of the support unit 1100 may be mounted on and aligned with the first and second support bracket 140A, 140B, respectively. The first end unit 1110 may be attached to the first support bracket 140A by using fastener such as, for example, bolt 152, washers 154, nuts 156 and/or the like.

Figure 6A:
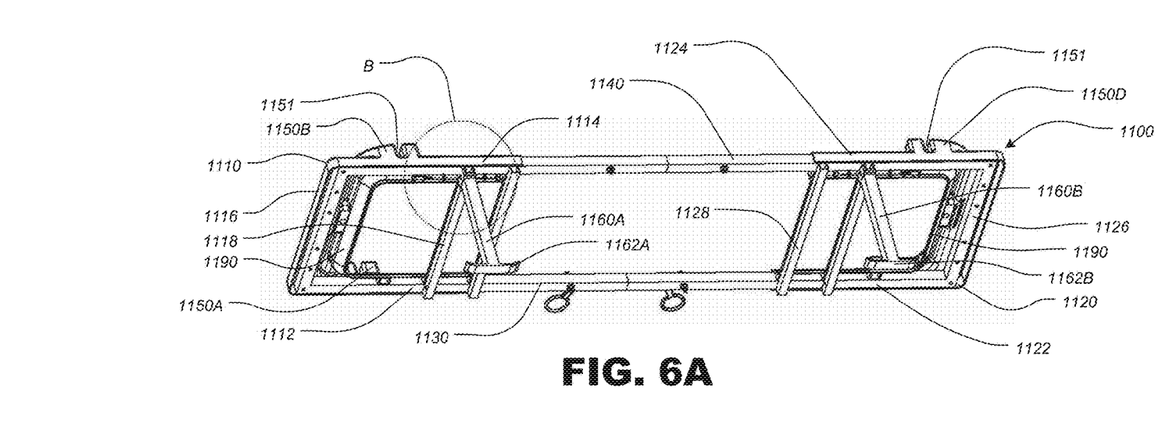
FIG. 6A shows a bottom perspective view of a support unit of the portable shelter shown in FIG. 5A.
Figure 6B:
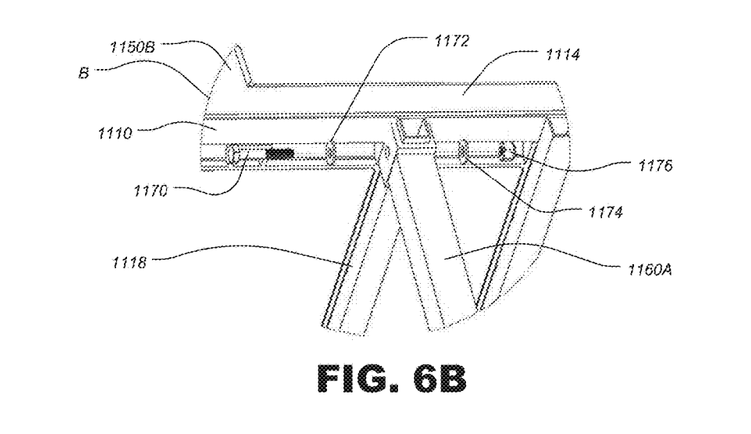
FIG. 6B shows an enlarged view of a portion of the support unit of FIG. 6A, indicated by circle B.

FIG. 6A shows a bottom perspective view of the support unit 1100. FIG. 6B shows an enlarged view of a section B of the support unit 1100 shown in FIG. 6A. With reference to FIG. 6A, the support unit 1100 may include one or more legs 1160, such as, for example, a first leg 1160A and a second leg 1160B. The first leg 1160A may be connected to and extend away (e.g., downwardly) from the second longitudinal component 1114 of the first end unit 1110. As shown in FIG. 6B, a top end of the first leg 1160A may be attached to the second longitudinal component 1114 (and/or the traversing member 1118) using a fastener such as, for example, a bolt 1170, washers 1172, 1174, a nut 1176, and/or the like. Alternatively, the first leg 1160A may be integrally formed with the longitudinal component 1114 (or the cross bar 1118). A foot 1162A may be formed at a bottom end of the first leg 1160A.

Similarly, a top end of the second leg 1160B may be connected to the second longitudinal component 1124 (and/or the traversing member 1128) of the second end unit 1120. A foot 1162B may be formed at a bottom end of the second leg 1160B. When the support unit 1100 is mounted on the floor 112, the feet 1162A, 1162B may be inserted into the predetermined gap between two neighboring ribs 114 of the floor 112. The feet 1162A, 1162B may be configured to be wide enough to snuggly fit into the gap between two neighboring ribs 114, which may prevent or resist the support unit 1100 from moving or rocking with respect to the floor 112, such as in a direction perpendicular to the ribs 114. Also, a relatively larger footprint of the feet 1162A, 1162B may contribute to more evenly distributing a weight applied to the floor 112 of the base 110. Hence, the feet 1162A, 1162B may reduce or prevent structural and cosmetic damage to the base 110.

Figure 7:
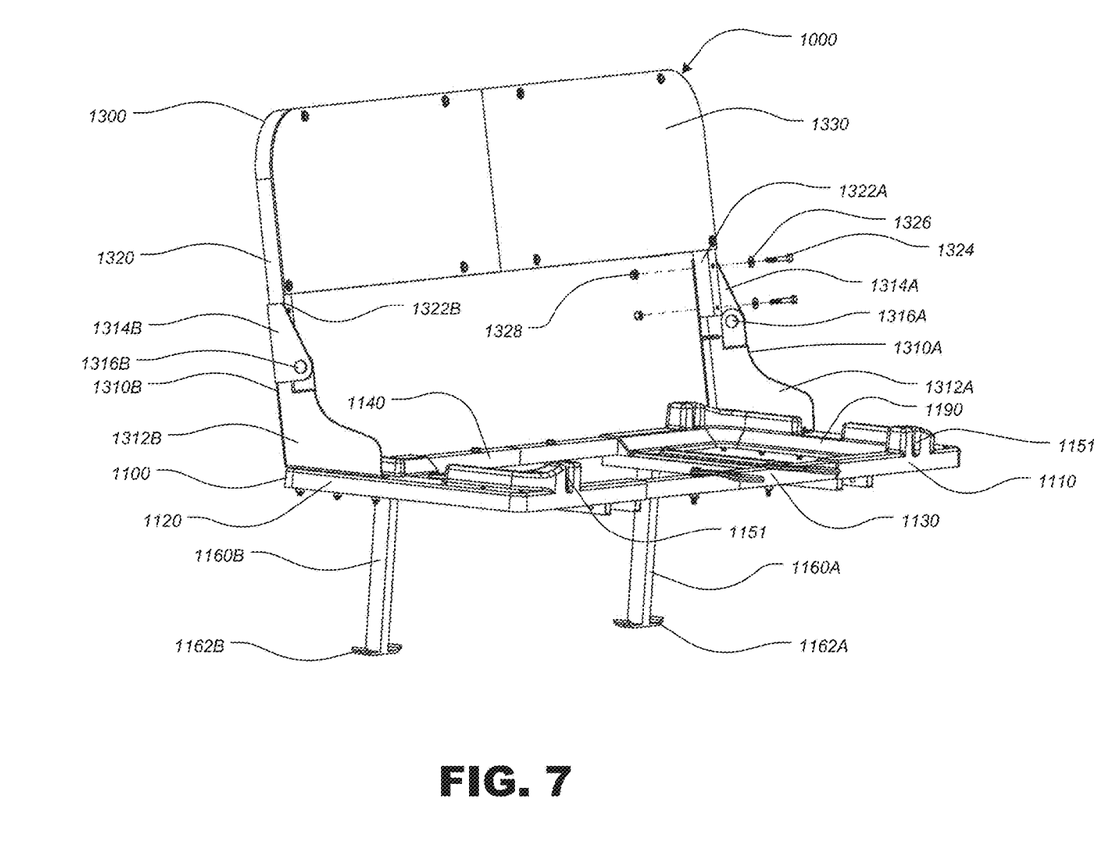
FIG. 7 shows a side perspective view of a shelter seat of the seating portion of the portable shelter shown in FIG. 2, without the removable storage.

FIG. 7 shows a side perspective view of the shelter seat 1000, without the removable storage 1200. As described above, the shelter seat 1000 may include the back support 1300 to laterally support a back of the user in the seating position. Also, the back support 1300 may be folded such that at least a portion of the back support 1300 may rest on the removable storage 1200. More specifically, the back support 1300 may include a first pivot base 1310A, a second pivot base 1310B, a top frame 1320, a panel 1330, and the like. The first pivot base 1310A may include a lower portion 1312A, an upper portion 1314A, and the like. The lower portion 1312A and the upper portion 1314A may be connected to each other via a pivot joint 1316A. Similarly, the second pivot base 1310B may include a lower portion 1312B and an upper portion 1314B, which may be connected to each other via a pivot joint 1316B. The lower portions 1312A and 1312B may be mounted on and connected to the first and second end units 1110, 1120, respectively, using fasteners such as, for example, bolts, washers, nuts and/or the like. The top frame 1320 may include a first leg 1322A and a second leg 1322B, which may be connected to the upper portions 1314A, 1314B, respectively, using fasteners such as, for example, bolts 1322, washers 1324, nuts 1326, and/or the like. The panel 1330 may be attached to the top frame 1320, using fasteners such as, for example, bolts, washers, nuts and/or the like.

When a force is applied to push or pull the back support 1300 towards the front of the shelter seat 1000, the upper portions 1314A, 1314B may pivotally move with respect to the pivot joints 1316A, 1316B, respectively, which may bring down the panel 1130 to rest substantially flat on the support unit 1100 with the removable storage 1200 therebetween. Such folding mechanism may make it easier and more convenient to transport and store the portable shelter 100.

Additionally, a locking mechanism (not shown) may be provided to lock the panel 1130 to the support unit 1100, thereby lockably securing the removable storage 1200 therebetween. Referring back to FIG. 2, the back support 1300 may further include a cushion 1340, which may be attached on a front side of the panel 1130 for more comfortable seating. Also, as shown in FIG. 3, one or more pockets 1350 may be attached on a rear side of the panel 1130 to provide additional storage spaces.

While the disclosure has been described in terms of exemplary embodiments, those skilled in the art will recognize that the disclosure can be practiced with modifications in the spirit and scope of the appended claim, drawings and attachment. The examples provided herein are merely illustrative and are not meant to be an exhaustive list of all possible designs, embodiments, applications or modifications of the disclosure.

What is claimed is:

1. A portable shelter, comprising: a base comprising a floor; and a seating unit mounted on the base and comprising a support unit configured to support and removably hold a removable storage, the removable storage comprising a storage space and a substantially flat top surface for supporting a user in a seating position, wherein the support unit comprises a surface pattern configured to make contact with the removable storage when the removable storage is mounted on the support unit, and wherein the surface for supporting the user in the seating position covers the storage space to form a covered storage space when the surface is positioned in the seating position, wherein the surface pattern is configured to make contact with and surround a corner of the removable storage when the removable storage is placed on the support unit.

2. The portable shelter of claim 1, wherein the support unit further comprises:
   a first longitudinal member extending along a longitudinal direction of the floor and having a first end and a second end;
   a second longitudinal member extending in parallel with the first longitudinal member and having a first end and a second end;
   a first end unit located on a first side portion of the floor and connected to the first ends of the first and second longitudinal members; and
   a second end unit located on a second side portion of the floor and connected to the second ends of the first and second longitudinal members,
   wherein the surface pattern is formed on at least one of the first end unit and the second end unit.

3. The portable shelter of claim 2, wherein the support unit further comprises:
   a first leg extending from the first end unit to the floor; and
   a second leg extending from the second end unit to the floor.

4. The portable shelter of claim 3, wherein the floor comprises a plurality of ribs thereon and extending in parallel with a predetermined gap therebetween,
   wherein each of the first leg and the second leg comprises a foot formed at an end thereof and inserted into the predetermined gap.

5. The portable shelter of claim 2, further comprising:
   a first bracket coupled between a first corner portion of the base and the first end unit; and
   a second bracket coupled between a second corner portion of the base and the second end unit.

6. The portable shelter of claim 1, wherein the removable storage further comprises a cushion having the substantially flat top surface.

7. The portable shelter of claim 1, wherein the removable storage further comprises a fastener for keeping the removable storage closed.

8. The portable shelter of claim 1, further comprising a back support extending upwardly from the support unit for laterally supporting a back of the user in the seating position.

9. The portable shelter of claim 8, wherein the back support is foldable.

10. A shelter seat, comprising: a removable storage comprising a storage space and a substantially flat top surface for supporting a user in a seating position; and a support unit configured to attach to a base having a floor and support and removably hold the removable storage, the support unit comprising a surface pattern configured to make contact with the removable storage when the removable storage is mounted to the support unit, wherein the surface for supporting the user in the seating position covers the storage space to form a covered storage space when the surface is positioned in the seating position, wherein the surface pattern is configured to make contact with and surround a corner of the removable storage when the removable storage is mounted to the support unit.

11. The shelter seat of claim 10, wherein the support unit further comprises:
- a first longitudinal member extending along a longitudinal direction of the floor and having a first end and a second end;
- a second longitudinal member extending in parallel with the first longitudinal member and having a first end and a second end;
- a first end unit located on a first side portion of the floor and connected to the first ends of the first and second longitudinal members; and
- a second end unit located on a second side portion of the floor and connected to the second ends of the first and second longitudinal members,
- wherein the surface pattern is formed on the first end unit and the second end unit.

12. The shelter seat of claim 11, further comprising:
- a first leg extending from the first end unit; and
- a second leg extending from the second end unit.

13. The shelter seat of claim 10, further comprising a back support extending from the support unit for laterally supporting a back of the user in the seating position.

14. A portable shelter, comprising: a movable base comprising a floor; a support unit configured to connect to the movable base and further configured to support and removably hold a removable storage, the removable storage comprising a storage space and a surface for supporting a user in a seating position; and a back support extending upwardly from the support unit for laterally supporting a back of the user in the seating position, wherein the support unit comprises a surface pattern configured to contact the removable storage when the removable storage is mounted on the support unit, and wherein the surface for supporting the user in the seating position covers the storage space to form a covered storage space when the surface is positioned in the seating position, wherein the surface pattern is configured to contact and surround a corner of the removable storage when the removable storage is mounted on the support unit.

15. The portable shelter of claim 14, wherein the support unit further comprises:
- a first longitudinal member extending along a longitudinal direction of the floor and having a first end and a second end;
- a second longitudinal member extending in parallel with the first longitudinal member and having a first end and a second end;
- a first end unit located on a first side portion of the floor and connected to the first ends of the first and second longitudinal members; and
- a second end unit located on a second side portion of the floor and connected to the second ends of the first and second longitudinal members,
- wherein the surface pattern is formed on at least one of the first end unit and the second end unit.

16. The portable shelter of claim 14, wherein the support unit further comprises:
- a first leg extending from the first end unit to the floor; and
- a second leg extending from the second end unit to the floor.

17. The portable shelter of claim 14, wherein the back support is foldable.

* * * * *